(12) United States Patent
Wilde et al.

(10) Patent No.: US 11,544,644 B2
(45) Date of Patent: Jan. 3, 2023

(54) PROJECT AGGREGATION AND TRACKING SYSTEM

(71) Applicant: Microsoft Technology Licensing, LLC, Redmond, WA (US)

(72) Inventors: Benjamin Gustav Wilde, Quincy, MA (US); Daniel John Niezgocki Chattan, Rowley, MA (US); Manoj Sharma, Winchester, MA (US); Richard Malcolm Banks, Chertsey (GB); Eva Britta Karolina Burlin, Cambridge (GB); Aleksandr Polyakov, Cambridge, MA (US); Lyndsy Marie Stopa, Lancaster, NY (US); Anthony Arnold Wieser, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/240,601

(22) Filed: Apr. 26, 2021

(65) Prior Publication Data

US 2022/0343258 A1 Oct. 27, 2022

(51) Int. Cl.
*G06Q 10/06* (2012.01)
*G06F 3/0482* (2013.01)

(52) U.S. Cl.
CPC ... *G06Q 10/063114* (2013.01); *G06F 3/0482* (2013.01); *G06Q 10/063118* (2013.01)

(58) Field of Classification Search
CPC ............ G06Q 10/00–50/00; G06F 1/00–40/00
USPC ................................. 705/7.11–7.42
See application file for complete search history.

(56) References Cited

U.S. PATENT DOCUMENTS

| 8,745,222 | B2* | 6/2014 | Chi ........................ G06Q 10/10 709/204 |
| 9,519,883 | B2* | 12/2016 | Childs .................... G06Q 10/10 |
| 10,796,255 | B2* | 10/2020 | Newhouse ........... G06Q 10/101 |
| 10,979,237 | B2* | 4/2021 | Milvaney .............. H04L 67/306 |
| 11,107,020 | B2* | 8/2021 | Faulkner ................ G06Q 10/10 |
| 11,169,654 | B2* | 11/2021 | Forster ................. G06Q 10/103 |
| 2004/0003352 | A1* | 1/2004 | Bargeron ............ G06F 16/9535 715/255 |
| 2005/0182773 | A1* | 8/2005 | Feinsmith .............. G06Q 30/06 |

(Continued)

OTHER PUBLICATIONS

"International Search Report and Written Opinion Issued in PCT Application No. PCT/US22/023209", dated Jul. 5, 2022, 10 Pages.

*Primary Examiner* — Alan S Miller
(74) *Attorney, Agent, or Firm* — Schwegman Lundberg & Woessner, P.A.

(57) ABSTRACT

A system and method for aggregating and tracking content is described. In one aspect, a computer-implemented method includes forming a consolidated graphical user interface that tracks activities related to a project identifier. The project identifier identifies aggregated content. A project search query is received on the consolidated graphical user interface. The system identifies the project identifier based on the project search query, and presents at least one of a content item, a file, a folder, a user identifier, a user message, a meeting identifier, and a website identifier associated with the project identifier. The system registers selected items with the project identifier with a user of the consolidated graphical user interface, and forms the aggregated content assigned to the project identifier and to the user based on the registered selection.

15 Claims, 17 Drawing Sheets

(56) References Cited

U.S. PATENT DOCUMENTS

| | | | |
|---|---|---|---|
| 2009/0234721 A1* | 9/2009 | Bigelow | G06Q 10/10 |
| | | | 715/753 |
| 2010/0245563 A1* | 9/2010 | Golovchinsky | H04N 7/18 |
| | | | 348/135 |
| 2011/0161425 A1* | 6/2011 | Xiao | G06F 16/2358 |
| | | | 707/769 |
| 2012/0151377 A1 | 6/2012 | Schultz et al. | |
| 2012/0284197 A1* | 11/2012 | Sitrick | G06Q 10/0631 |
| | | | 705/301 |
| 2014/0164511 A1* | 6/2014 | Williams | G06Q 50/01 |
| | | | 709/204 |
| 2014/0372539 A1* | 12/2014 | Zaveri | H04L 51/52 |
| | | | 709/206 |
| 2017/0257406 A1* | 9/2017 | Wilde | G06Q 10/00 |
| 2017/0269791 A1* | 9/2017 | Meyerzon | G06Q 10/101 |
| 2017/0285890 A1* | 10/2017 | Dolman | G06Q 10/101 |
| 2017/0285895 A1* | 10/2017 | Nathwani | G06Q 10/101 |
| 2018/0114177 A1* | 4/2018 | Somech | G06Q 10/063118 |
| 2018/0123815 A1* | 5/2018 | Milvaney | H04L 12/1827 |
| 2018/0189706 A1* | 7/2018 | Newhouse | G06Q 10/101 |
| 2018/0314680 A1* | 11/2018 | Dorai | G06F 40/166 |
| 2020/0125679 A1* | 4/2020 | Wadsted | G06F 16/9535 |
| 2020/0293975 A1* | 9/2020 | Faulkner | G06Q 10/06316 |

* cited by examiner

FIG. 11

PROJECT AGGREGATION AND TRACKING SYSTEM

BACKGROUND

The subject matter disclosed herein generally relates to a special-purpose machine that generates a consolidated graphical user interface that suggests and tracks different types of objects. Specifically, the present disclosure addresses systems and methods for identifying dynamic content from multiple sources and tracking the dynamic content in a consolidated graphical user interface.

A document authoring application (e.g., Microsoft Word™ or any application from Microsoft Office™) is typically used to author a document and provides the user with a list of recent files accessed by the document authoring application. The list of recent files may not be always be relevant to the user. As such, the user may have to manually search through folders to identify content from previously generated documents that may be relevant to the document currently present in the document authoring application.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 11 illustrates an example graphical user interface of a project aggregating and tracking platform in accordance with one example embodiment.

DETAILED DESCRIPTION

Figure 1:
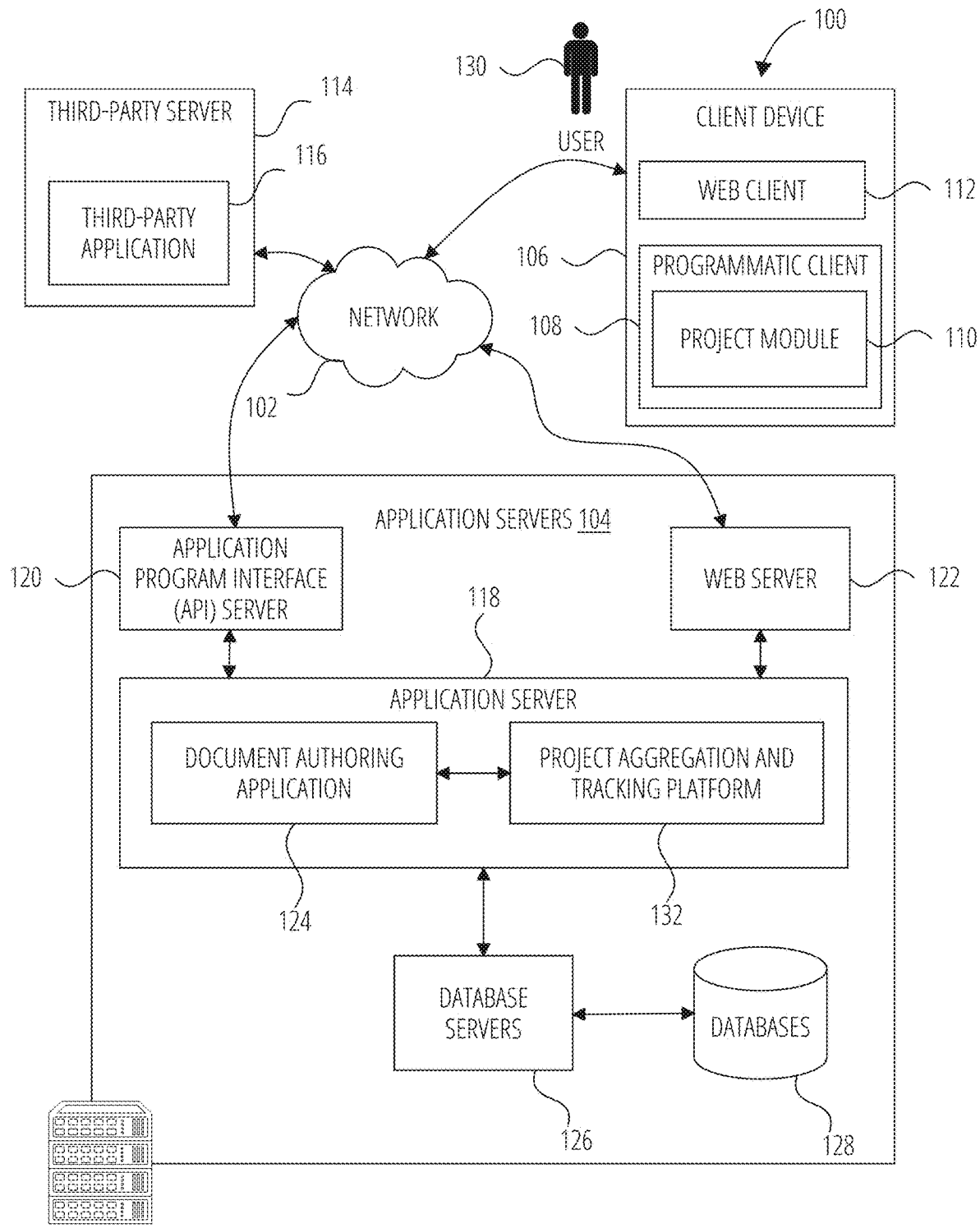
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Items such as documents, document elements/content, meeting records, conversations records, and tasks records can be difficult to keep track of. These items are typically stored in a diverse set of locations and tools. For example, a document may be stored in a file folder on one server. Meeting records can be stored in a storage location on another server associated with a calendar application. Messages can be stored in a different storage location that is associated with a message application. Furthermore, the storage locations for each different application may be partitioned for different users of different organizations.

A project can include a plan or a design to achieve an end result. In one example, a project can be associated with items such as a group of users of an enterprise, files, documents, folders, content items, and applications. In other examples, a project may be composed of processes, tasks, and procedures. The project can be labeled using a project identifier. The project identifier can be mapped to one or more items (e.g., users of an enterprise, files, documents, folders, content items, and applications). In another example, the project identifier can include metadata that identifies the items, status of the project, status of the items, access rights and edit privileges to the items, authorized users.

Therefore, a project can include items from a variety of sources. Additional users working on a same project contribute to the complexity of tracking items of a project. As such, it can be challenging to access and keep track of all items of a project. It can be especially difficult to keep track of changing content of all items of a project.

The present application describes a system and method for aggregating content pertaining to a project identifier (that identifies a project) and keeping track of the aggregated content in the project. The aggregated content includes, for example, items of different types and from different sources.

Examples of items include documents, document elements/ content, meeting records, conversations data, files, folders, and tasks.

In a first example embodiment, the system includes a project workspace graphical user interface (GUI) that displays the aggregated content. A user of the project workspace GUI enters a search query (e.g., name of a project). The system suggests a set of related items (e.g., documents, sites, and people) based on the search query. The system then identifies which of the items the user selects to include and track as part of the project. In one example, the tracked items can be presented as in a GUI such as a card format (e.g., a card format presents pertinent information of the item presented in a manner that looks like a physical paper card). In another example, the tracked items are presented in an aggregated view. Other example embodiments include: the ability to manually organize this set of aggregated content (e.g., into folders or a hierarchy), the ability to search or filter the set of aggregated content, the ability to create a new piece of content/item (e.g., a document) that is automatically associated with the project, the ability to see, directly on the card, additional metadata about that object (e.g., who is currently working on it, a live view into it).

In a second example embodiment, the system includes a project workspace GUI that tracks a status/changes to the aggregated content. Once the system identifies the aggregated content (that is made up of items selected by the user as part of a project), the system accesses the latest information about the items and provides a summary view of the items across the entire project. Example of views include: an activity feed showing everything that has happened across all of the items/documents that are part of a project; a people-first view or filter showing items that an individual has accomplished within the scope of the project; an overview that summarizes some of the important changes across a project (e.g., showing which content is "hot," how many people have been active recently, and what is currently blocked); a user-centric view that shows the work from within the project that is currently on a user of the system; a cross-project view that shows all of the projects the user is involved in and helps the user decide where the user should be spending his/her time; a task view that shows all tasks related to the project (including tasks that were created within the documents that are part of the project).

In one example, a document authoring application (e.g., Microsoft Word™, Microsoft PowerPoint™) generates the documents. The system can identify content (from other documents previously authored, edited, shared by the user, or shared with the user, accessible to the user) with a high likelihood of relevance to the project identifier (e.g., using metadata keywords of the project identifier/documents). The system then presents a list of suggested items/projects in a user interface element of the system. The suggested item is not limited to content from documents. The suggested item can also include any content or data that is pertinent or relevant to the project identifier. Examples of suggested content include, but are not limited to information about related person or resources, information from the web, previous decisions from workflow processes, tasks, whiteboards, extracts from meetings, emails, chat conversations, links to a document, embedded version of a document (or a piece thereof).

In one example, the user belongs to an enterprise. The enterprise represents an organization or groups of users associated with an organization. The users of the enterprise may make use of enterprise applications operating on client machines. Examples of enterprise applications include chat-based applications, email applications, document authoring applications, document editing applications, document viewing applications, document sharing applications, and other types of applications used by enterprises.

In one aspect, a computer-implemented method includes forming a consolidated graphical user interface that tracks activities related to a project identifier, the project identifier identifying aggregated content, receiving a project search query on the consolidated graphical user interface, identifying the project identifier based on the project search query, detecting a selection of the project identifier in the consolidated graphical user interface, identifying and presenting at least one of a content item, a file, a folder, a user identifier, a user message, a meeting identifier, and a website identifier associated with the project identifier, in the consolidated graphical user interface, detecting a selection of at least one of the content item, the file, the user identifier, the user message, the meeting identifier, or the website identifier in the consolidated graphical user interface, registering the selection with the project identifier with a user of the consolidated graphical user interface, and forming the aggregated content assigned to the project identifier and to the user based on the registered selection, the aggregated content includes a dynamic element that is updated near real-time based on changes to the dynamic element by other users having access to the dynamic element.

In one example, the system presents candidate items that are pertinent to the project. The candidate item includes an instance of the selected candidate document or candidate content in the document.

In one example, the method further comprises: including a reference (or active link) of the selected candidate document. The reference causes a dynamic display of the selected candidate document. The reference or instance of the document may also be referred to as a Fluid Component™, a product of Microsoft Inc., The Fluid Component includes for example, text, tables, charts, and task lists. The Fluid Component can be inserted into emails, documents, and chats. The permissions and access are handled automatically based on access permission to the Fluid Component.

Because Fluid Components are dynamic and stay updated no matter where they are hosted across different service applications (e.g., Microsoft Word, Microsoft Excel, Microsoft PowerPoint), the information stays updated and relevant. But, unlike a document, a Fluid Component is "a little atomic unit of productivity" and fully rendered inline. As such, the user does not need to click on the Fluid Component to open up the corresponding content in another browser tab. The entire Fluid Component is displayed in context in the document authoring application or project workspace and the user can immediately start editing the Fluid Component. Edits to Fluid Component by several users are synchronized in near real-time across all different service applications used to edit/view the same fluid Component.

As a result, one or more of the methodologies described herein facilitate solving the technical problem of aggregating and keeping track of items of different types from multiple sources. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed.

One or more application servers 104 provide server-side functionality via a network 102 to a networked user device, in the form of a client device 106. A user 130 operates the client device 106. The client device 106 includes a web client 112 (e.g., a browser operating a web version of an enterprise application), a programmatic client 108 (e.g., a client-side enterprise document application such as Microsoft PowerPoint™) that is hosted and executed on the client device 106. In one example embodiment, the programmatic client 108 includes a project module 110 that displays a centralized graphical user interface for aggregating content and tracking content of a project.

For example, the project module 110 generates a display of a user interface element (e.g., pane/window/workspace) that includes candidate items (e.g., recommended or suggested documents/users/items or relevant dynamic real-time content from other documents) in the graphical user interface of the programmatic client 108. In another example, the candidate items may include a set of items from a library of projects. The library of projects may identify and map items to a specific project. In another example, the specific project is defined and associated with a particular enterprise user. In another example, the items include documents that have been previously edited, accessed, authored, shared with or by the user 130. The library of projects and documents may be stored in databases 128.

In one example, the project module 110 detects that the user 130 has started the programmatic client 108. The project module 110 identifies candidate projects/items based on a profile of the user 130 (e.g., user 130 is a new engineer in Team X), events of the programmatic client 108 (e.g., words/phrases just typed by the user 130), and calendar events (e.g., user 130 just left a meeting related to project Y), attributes of projects in the library of projects (e.g., most opened projects from members of a group), project assigned by another user to user 130 as indicated by a task application or communicated via email. The project module 110 displays candidate projects in the centralized graphical user interface. The project module 110 detects the user 130 selecting a candidate project and displays candidate items based on the selected project. In another example, the user 130 specifies an item to be included as part of the selected project.

The project module 110 may operate with the web client 112 and/or the programmatic client 108. In one example embodiment, the project module 110 is part of the programmatic client 108 or web client 112. For example, the project module 110 may operate as an extension or add on to the web client 112.

An Application Program Interface (API) server 120 and a web server 122 provide respective programmatic and web interfaces to application servers 104. A specific application server 118 hosts a document authoring application 124, and a project aggregation and tracking platform 132. The document authoring application 124 and the project aggregation and tracking platform 132 include components, modules and/or other sub-applications.

The document authoring application 124 includes a content creation application (e.g., Microsoft PowerPoint™, Microsoft Word™) that enables the user 130 to form content such as a presentation document, or a text document. In another example, the document authoring application 124 also includes a collaborative application that enables peer enterprise users to collaborate on a shared document. For example, the client device 106 accesses the document authoring application 124 to view and edit a document that is shared with other peer users. Other examples of document authoring application 124 includes enterprise systems, content management systems, and knowledge management systems. The document authoring application 124 communicates with the programmatic client 108 on the client device 106. For example, the programmatic client 108 checks in with the document authoring application 124 and verifies a validity of a license or version of the programmatic client 108 on the client device 106. In another example embodiment, the programmatic client 108 includes at least one of a content creation application, a collaborative application, and a shared storage application.

In one example embodiment, the project aggregation and tracking platform 132 communicates with the document authoring application 124 (and/or the project module 110) to identify candidate projects and candidate items based on a machine learning model that identifies the content provided by the user 130 in the programmatic client 108 (or in the web client 112, or document authoring application 124), a profile of the user 130, attributes of a document currently edited in the programmatic client 108, features of documents in a library of documents previously authored, shared, edited by the user 130, or share with the user 130), keywords entered in the centralized graphical user interface of the project module 110. The project aggregation and tracking platform 132 communicates with the project module 110 supported by the web server 122 to provide the candidate projects and items to the programmatic client 108. In another example, the project module 110 includes functionalities of the project aggregation and tracking platform 132. In another example, the project module 110 includes components of the project aggregation and tracking platform 132.

In one example embodiment, the project aggregation and tracking platform 132 suggests candidate projects to the user 130. The project aggregation and tracking platform 132 detects that the user 130 has selected a project (from a list of candidate projects). The project aggregation and tracking platform 132 presents a list of items that are mapped to the selected project. The user 130 selects the items to be included and tracked as part of the selected project. The project aggregation and tracking platform 132 aggregate the selected items and tracks the status of the selected items.

In one example embodiment, the project aggregation and tracking platform 132 generates a consolidated graphical user interface that enables the user to select items and track a status of the items in one location. The project aggregation and tracking platform 132 updates a content of the items based on dynamic real-time synchronization of the file (e.g., when an author or authorized user of a file modifies the content of the file, the item is updated to reflect the updated content of the file).

In one example embodiment, the web client 112 communicates with the project aggregation and tracking platform 132 and the document authoring application 124 via the programmatic interface provided by the Application Program Interface (API) server 120. In another example embodiment, the project aggregation and tracking platform 132 sends the candidate documents/items to the project module 110 or the document authoring application 124. The project aggregation and tracking platform 132 causes a display of the selected candidate items in a pane pop-up based on current activities of the user 130 and other users of the team.

In one example embodiment, the project aggregation and tracking platform 132 trains a machine learning model based on application events (e.g., activities of the user 130 on the client device 106 or the document authoring application 124) and features of projects/items from the library of projects/items. The project aggregation and tracking platform 132 uses a machine learning model to determine whether a project/item from the library of projects/items is pertinent to the user 130. The project aggregation and tracking platform 132 identifies a set of candidate projects/items and causes the project module 110 (or the programmatic client 108 or the web client 112) to display a pane in the graphical user interface provided by the programmatic client 108 or the web client 112.

The application server 118 is shown to be communicatively coupled to database servers 126 that facilitates access to an information storage repository or databases 128. In an example embodiment, the databases 128 includes storage devices that store information provided by the document authoring application 124 and other applications of the enterprise. For example, the databases 128 include a library of projects, items (e.g., meeting notes, charts, graphs, audio clips, files, folders), documents (e.g., documents that are shared with the user 130, shared by the user 130, accessed, authored, or edited by the user 130 using the web client 112 or the programmatic client 108).

Additionally, a third-party application 116 executing on a third-party server 114, is shown as having programmatic access to the application server 118 via the programmatic interface provided by the Application Program Interface (API) server 120. For example, the third-party application 116, using information retrieved from the application server 118, may supports one or more features or functions on a website hosted by the third party. For example, the third-party application 116 identifies activities (e.g., user 130 just finished an online meeting related to project Y) of the user 130 on the programmatic client 108. The third-party application 116 provides the activities to the project aggregation and tracking platform 132. The content recommendation engine 310 identifies candidate projects (e.g., project X is related to project Y)/items pertinent to the user 130 based on the activities of the user 130.

Figure 2:
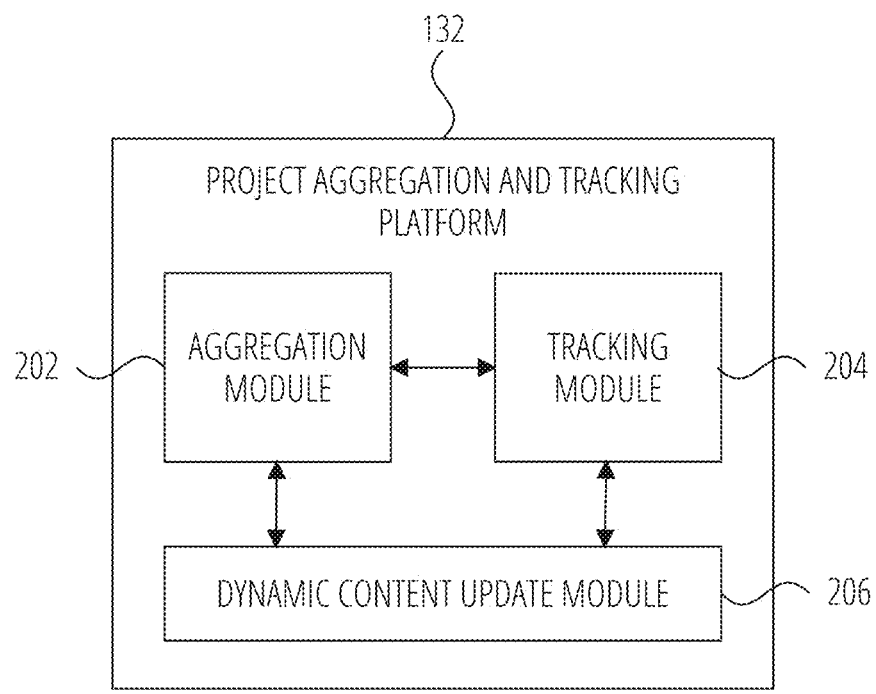
FIG. 2 is a block diagram illustrating a project aggregation and tracking platform in accordance with one example embodiment.

FIG. 2 is a block diagram illustrating a project aggregation and tracking platform 132 in accordance with one example embodiment. The project aggregation and tracking platform 132 includes an aggregation module 202, a tracking module 204, and a dynamic content update module 206.

The aggregation module 202 suggests candidate projects based on activities of the user 130 or keyword entries from the user 130, suggests candidate items based on a selected project, and map selected candidate items to the selected project. In another example, the aggregation module 202 maps a file or link specified by the user 130 to the project. In one example embodiment, the aggregation module 202 generates a first graphical user interface (e.g., project workspace) that allows the user to enter keywords related to a project and view a list of candidate projects. In another example embodiment, the first GUI of the aggregation module 202 provides a list of candidate items for a project selected by the user 130. In one example embodiment, the aggregation module 202 generates a second graphical user interface (e.g., aggregated view) that presents candidate items based on the selected project. The second GUI allows the user 130 to select items to be tracked as part of the selected project.

The tracking module 204 tracks and organizes a status of an item content. In one example, the tracking module 204 generates a third GUI (e.g., summary view) that presents a status of the items that are part of the project. The status of the items can be presented based on a relevance of an item pertaining to the user 130 (e.g., item A is assigned to user 130 and has an upcoming deadline). The items can be organized by types, users, deadlines, comments, edits, mentions, or tasks.

The dynamic content update module 206 enables the content of an item to be dynamically up to date. For example, a project includes a graph that is authored by another user. Later, another user with access privilege edits the graph. The dynamic content update module 206 dynamically updates the graph to automatically include the latest up to date content in the project.

Figure 3:
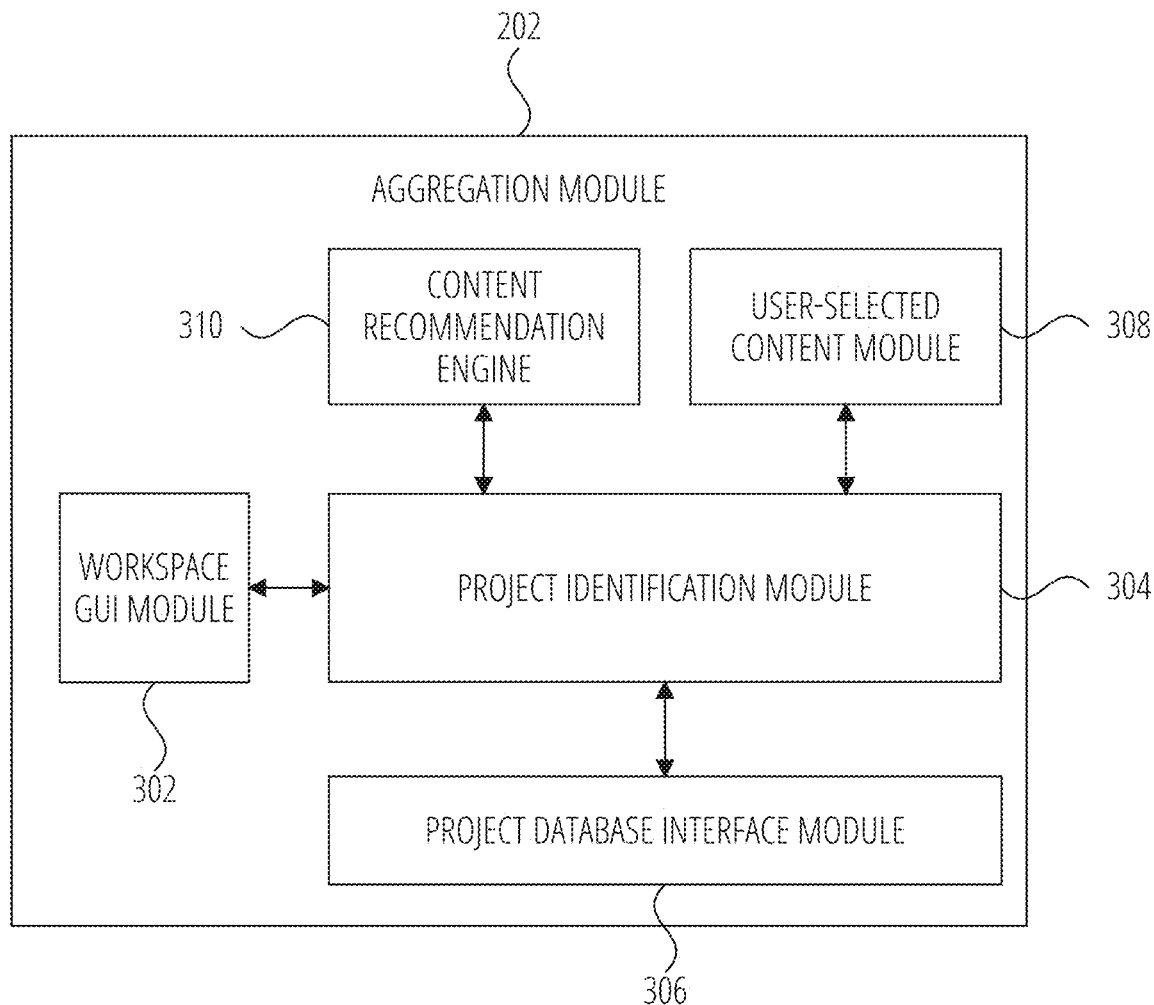
FIG. 3 is a block diagram illustrating an aggregation module in accordance with one example embodiment.

FIG. 3 is a block diagram illustrating a project aggregation and tracking platform 132 in accordance with one example embodiment. The aggregation module 202 includes a workspace GUI module 302, a project identification module 304, a project database interface module 306, a user-selected content module 308, and a content recommendation engine 310.

The workspace GUI module 302 generates a consolidated graphical user interface that includes, for example, the first, second, and third GUI described above with respect to FIG. 2). The workspace GUI module 302 communicates with the project identification module 304, the content recommendation engine 310, the user-selected content module 308, and the project database interface module 306.

The content recommendation engine 310 identifies candidate projects based on activities of the user 130 or a keyboard entry (e.g., project search query) from the user 130. In another example, the content recommendation engine 310 detects a selection of a project from the candidate projects via the GUI, and in response the content recommendation engine 310 identifies candidate items based on selected project. An example embodiment of the content recommendation engine 310 is described in more detail below with respect to FIG. 4.

The user-selected content module 308 enables the user 130 to select or specify a specific item (e.g., identify a location of a file/folder, a user, a group, a link to a source). In one example, the user 130 interacts with the consolidated GUI of the workspace GUI module 302 to identify the specific item.

The project identification module 304 identifies a selected project and retrieves a list of items associated with the selected project. In one example, the project identification module 304 accesses a project database with the project database interface module 306 to retrieve candidate projects and candidate items associated with the candidate projects. The project identification module 304 causes the consolidated GUI to present a list of items associated with the selected project. The project identification module 304 detects selected items from the user 130 via the consolidated user interface and maps/associates the selected items with the selected project. In another example, the project identification module 304 maps/associates a user-specified item (from the user-selected content module 308) with the selected project.

Figure 4:
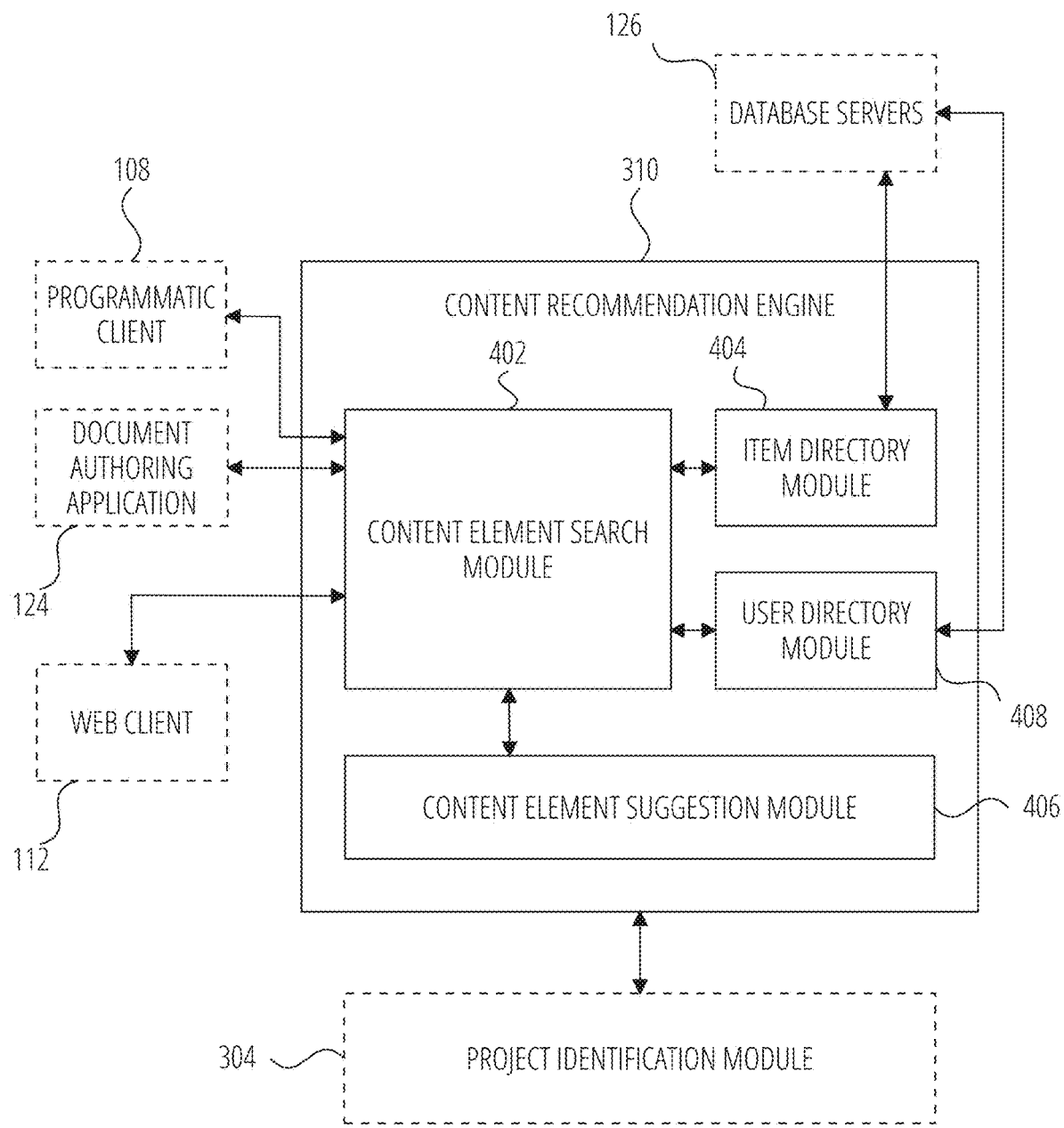
FIG. 4 is a block diagram illustrating a content recommendation engine in accordance with one example embodiment.

FIG. 4 is a block diagram illustrating a content recommendation engine 310 in accordance with one example embodiment. The content recommendation engine 310 includes a content element search module 402, an item directory module 404, a content element suggestion module 406, and a user directory module 408.

The content element search module 402 searches for candidate projects that are pertinent to the user 130. For example, the content element search module 402 detects user activities from the programmatic client 108, the document authoring application 124, and the web client 112. An example of user activity includes the words/phrases written by the user 130 of the document authoring application 124. In one example, the content element search module 402 uses machine learning to identify relevant keywords or key terms. Other examples of user activities include activities within the programmatic client 108, the document authoring application 124, and the web client 112. For example, the user activities data include copy and paste activities (e.g., which previous document was used to copy in a present document, which part of the previous document was copied), file activities (e.g., which files were last opened by the user 130, which files were recently updated from a group folder shared with the user 130), the type of content (e.g., a PowerPoint slide) being created by the user 130, which features of the document authoring application 124, programmatic client 108, and web client 112 are being used by the user 130, and other user activities related to the document authoring application 124, the programmatic client 108, and the web client 112.

In another example, the content element search module 402 identifies a user profile of the user 130 (e.g., user 130 is a new employee and is part of team X). The content element search module 402 accesses the user profile and identifies projects and items that are associated with team X.

The item directory module 404 accesses a library of items/documents (that can be accessed with the programmatic client 108) stored in the databases 128. In one example, the library of documents includes different types of documents (e.g., Word documents or PowerPoint documents). The library of documents includes documents shared by the user 130 and documents shared with the user 130. In another example, the library includes documents that the user 130 has or has not previously viewed, edited, or authored. In another example, the library of documents includes documents created by any employee of an enterprise associated with the user 130. In another example, the library of documents includes any documents publicly or privately accessible by the user 130. The item directory module 404 accesses the documents and the corresponding attributes (e.g., metadata) of the documents from the library of documents in databases 128, from another storage server, or from another computing device. The item directory module 404 provides the items/documents and corresponding attributes to the content element search module 402.

In one example embodiment, the content element search module 402 operates using pattern detection algorithms and trained Machine Learning (ML) models to identify relevant projects or items (e.g., projects that are relevant to the user 130, items that are pertinent to a selected project). For example, the content element search module 402 trains a machine learning model based on the signals from the programmatic client 108, document authoring application 124, web client 112 to determine whether a project/item is likely to be pertinent/relevant to the user 130. In one example embodiments, the content element search module 402 analyzes events in the document authoring application 124 or programmatic client 108 to identify trends (e.g., a user has frequently chosen a particular item/project in the past). The content element search module 402 can also access signals from the item directory module 404 and the user directory module 408. The user directory module 408 accesses a directory of users of the enterprise and identifies a profile of the user 130. Using the information from the signals, the content element search module 402 can identify trends. Based on the machine learning model, the content element search module 402 can, in one embodiment, suggest candidate projects/items. The content element search module 402 provides the set of candidate projects/items to the content element suggestion module 406.

The content element suggestion module 406 communicates the candidate projects/items to the project aggregation and tracking platform 132. In one example embodiment, the content element suggestion module 406 generates a display of the set of candidate projects/items in a user interface (e.g., a pane) of the programmatic client 108. In another example embodiment, the content element suggestion module 406 identifies content (that the user 130 is likely to include as part of a project) from the set of candidate items in the user interface.

In another example embodiment, the content element search module 402 accesses signals from the document authoring application 124. Example of signals include, but are not limited to: user activities history, document context, format of the document, expertise or profile of the user, project identification, key words, key phrases in the document. The signals may be obtained as the user 130 types.

Figure 5:
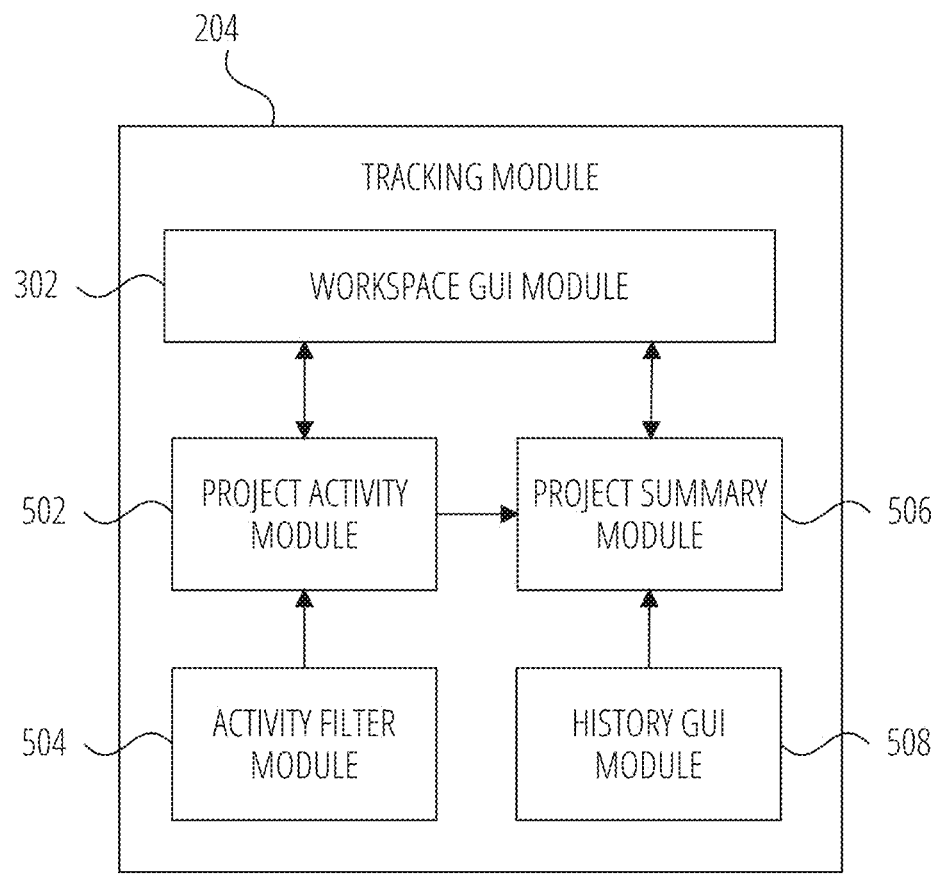
FIG. 5 is a block diagram illustrating a tracking module in accordance with one example embodiment.

FIG. 5 is a block diagram illustrating a project aggregation and tracking platform 132 in accordance with one example embodiment. The tracking module 204 includes a project activity module 502, an activity filter module 504, a project summary module 506, a workspace GUI module 302, and a history GUI module 508.

The project activity module 502 determines a status of selected items that are mapped to a selected project. For example, the project activity module 502 displays the latest activities pertaining to items of a project (e.g., user A edited file B, user C had an online meeting with user D, user E assigned a task to user F). In one example, the project activity module 502 provides the latest activities data to the workspace GUI module 302 for display in an "activity" GUI area of the consolidated GUI.

The activity filter module 504 can filter the item activities by different categories. For example, the activity filter module 504 filters the activities that are pertinent to a specific user selected by user 130. In other examples, the activity filter module 504 filters the activities by types of activities (e.g., meetings).

The project summary module 506 provides a summary of activities based on the type of activities and based on a user-specified time period (e.g., last week, next week). For example, the project summary module 506 summarizes the activities by types (e.g., edits, task assigned, number of active documents, number of active users of the project).

Figure 6:
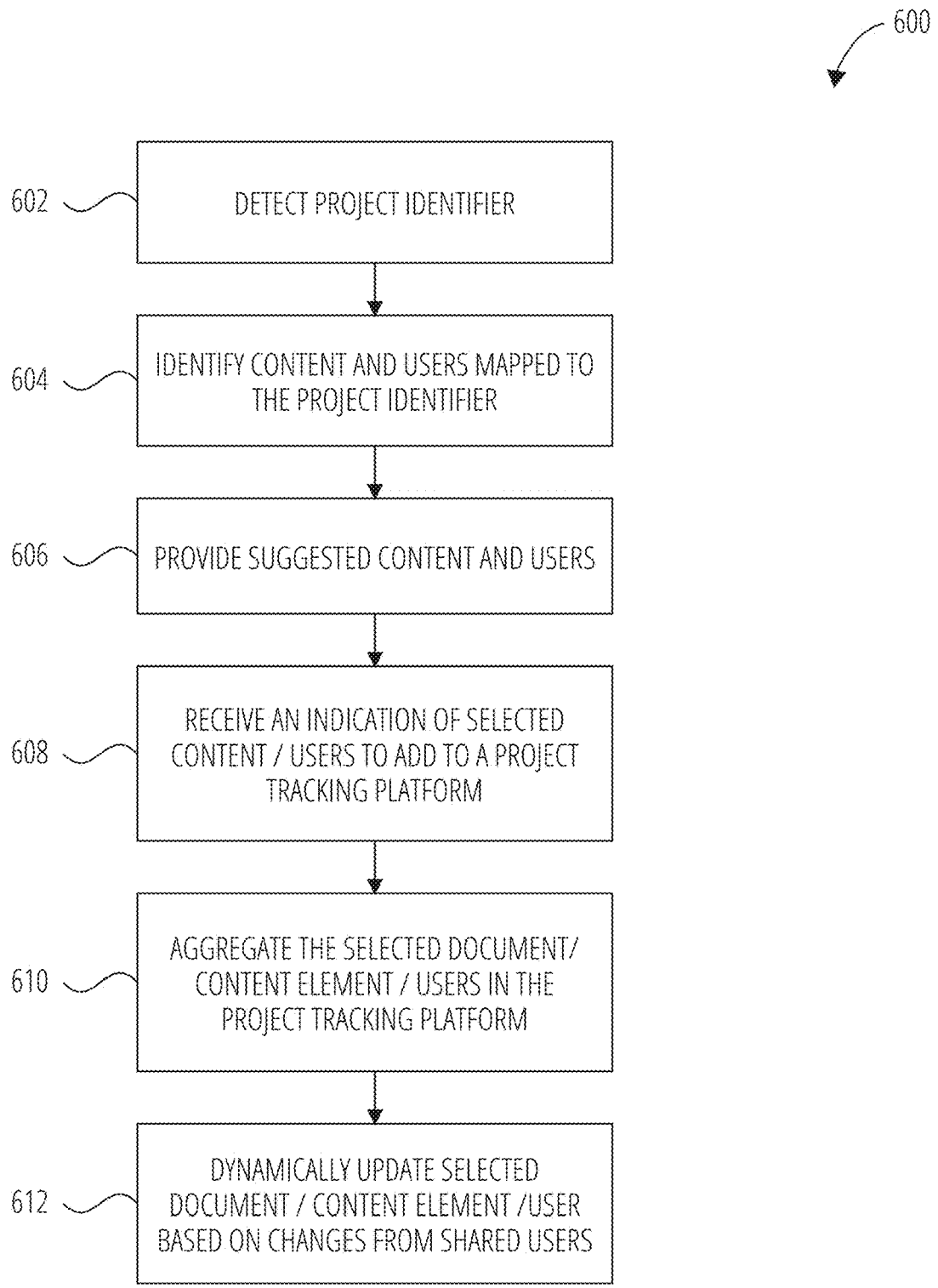
FIG. 6 is a flow diagram illustrating a method for aggregating content in accordance with one example embodiment.

FIG. 6 is a flow diagram illustrating a method for aggregating content in accordance with one example embodiment. Operations in the method 600 may be performed by the aggregation module 202, using components (e.g., modules, engines) described above with respect to FIG. 3. Accordingly, the method 600 is described by way of example with reference to the aggregation module 202. However, it shall be appreciated that at least some of the operations of the method 600 may be deployed on various other hardware configurations or be performed by similar components residing elsewhere. For example, some of the operations may be performed at the project module 110.

In block 602, the project identification module 304 detects a project identifier. In one example, the project identifier is specified by the user 130. In another example, the project identifier is not specified by the user 130 but identified by parsing/identifying content items in a project. In block 604, the content recommendation engine 310 identifies projects/items/users mapped to the project identifier. In block 606, the content recommendation engine 310 provides suggested projects/items/content/users. In block 608, the user-selected content module 308 receives an indication of selected content/users to add to a project tracking platform. In block 610, the project identification module 304 aggregates the selected document/content element/users in the project tracking platform. In block 612, the project database interface module 306 dynamically updates the selected document/content element/user based on changes from other users (having edit rights to the corresponding content element/document).

Figure 7:
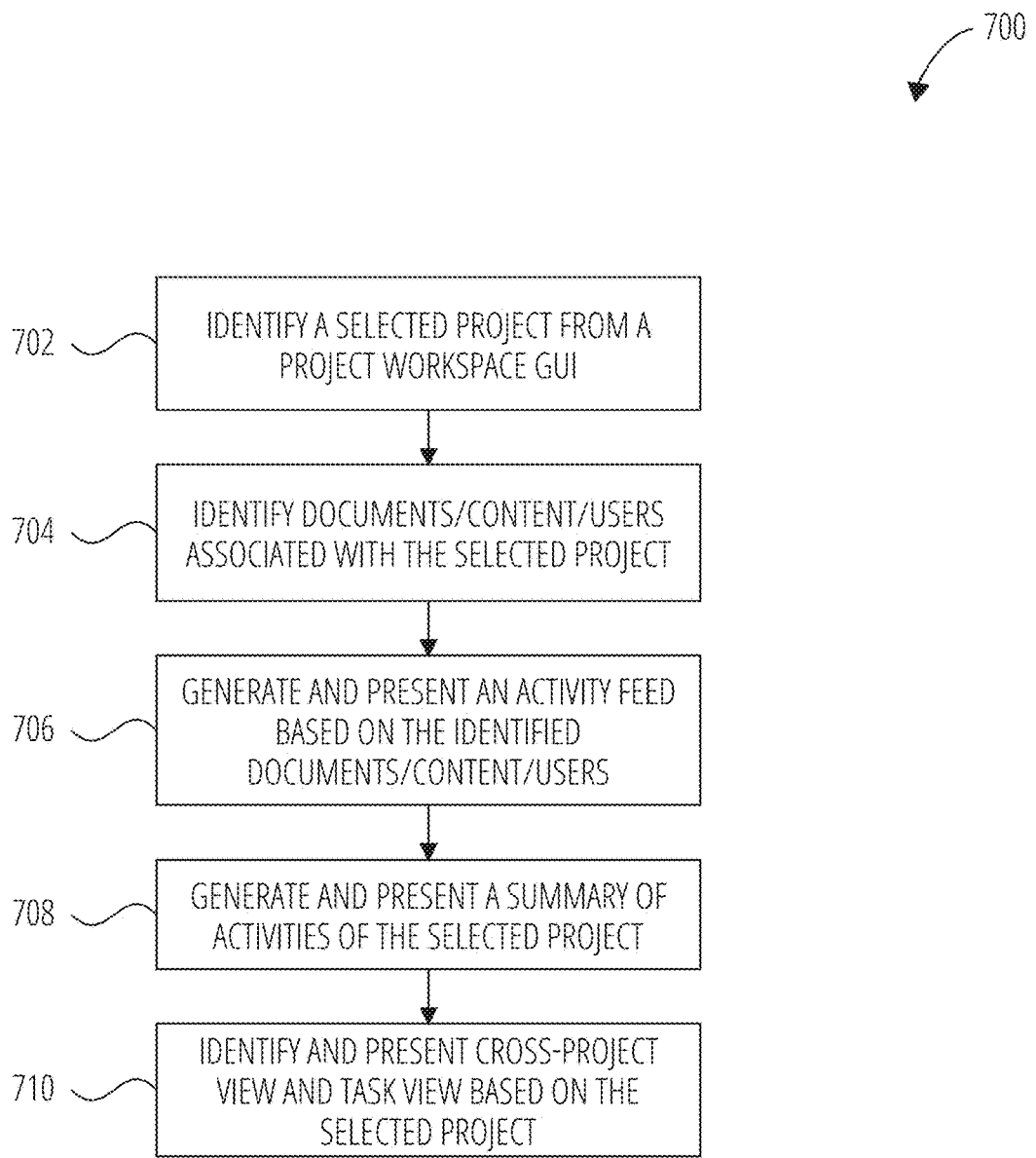
FIG. 7 is a flow diagram illustrating a method for generating a summary of activities in accordance with one example embodiment.

FIG. 7 is a flow diagram illustrating a method for generating a summary of activities in accordance with one example embodiment. Operations in the method 700 may be performed by the tracking module 204, using components (e.g., modules, engines) described above with respect to FIG. 5. Accordingly, the method 700 is described by way of example with reference to the tracking module 204. However, it shall be appreciated that at least some of the operations of the method 700 may be deployed on various other hardware configurations or be performed by similar components residing elsewhere. For example, some of the operations may be performed at the project module 110.

In block 702, the workspace GUI module 302 identifies a selected project from a project workspace GUI. In block 704, the workspace GUI module 302 identifies documents/content/users associated with the selected project. In block 706, the project activity module 502 generates and presents an activity feed based on the identified documents/content/users. Examples of activity feed include but are not limited to tasks, outstanding work, summaries of activities happening in the project, state changes. In block 708, the project summary module 506 generates and presents a summary of activities of the selected project. In block 710, the project activity module 502 identifies and presents cross-project view and task view based on the selected project.

Figure 8:
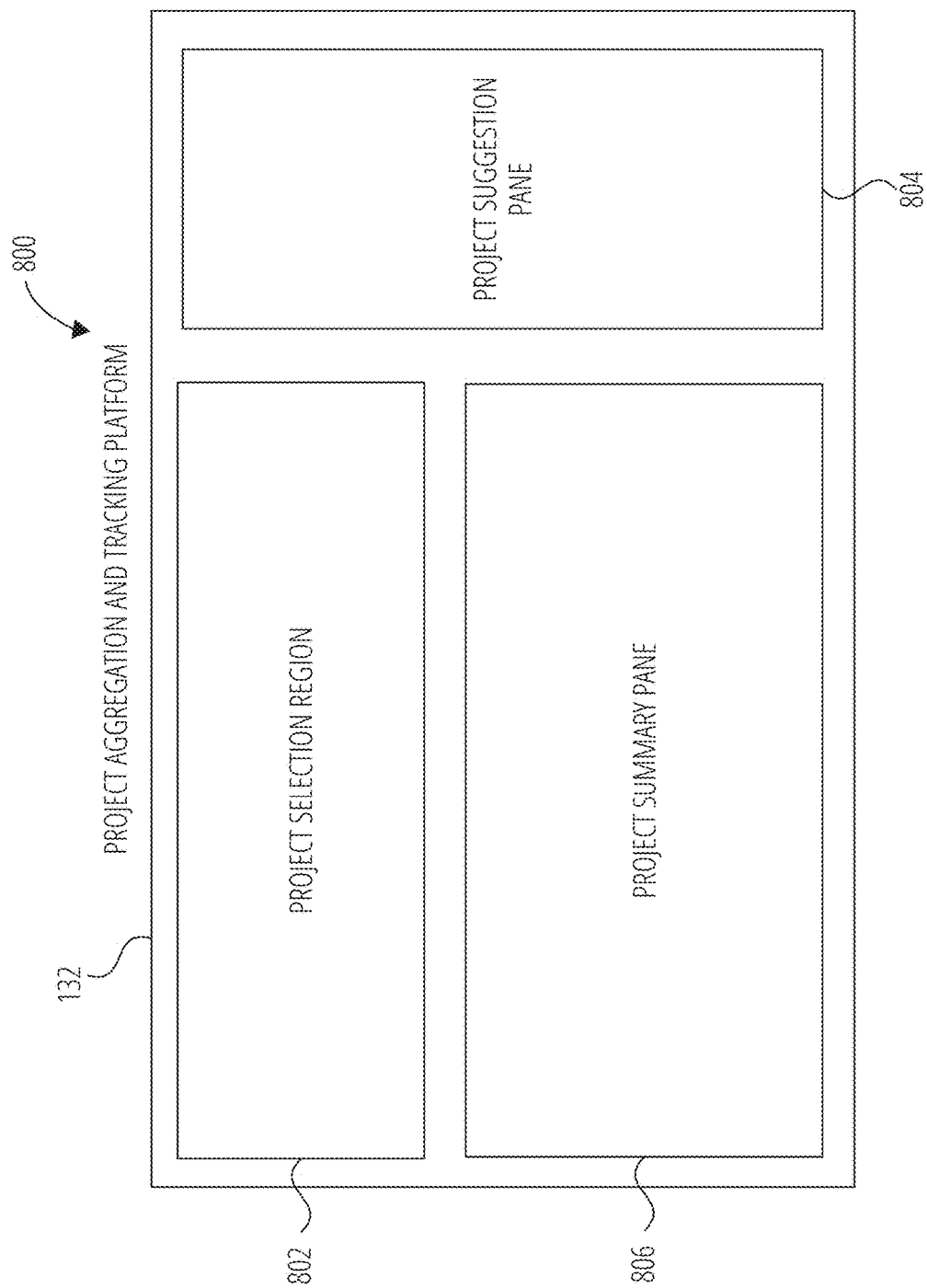
FIG. 8 illustrates an example of a graphical user interface of a project aggregating and tracking platform in accordance with one example embodiment.

FIG. 8 illustrates an example of a graphical user interface 800 in accordance with one example embodiment. The graphical user interface 800 depicts the project aggregation and tracking platform 132, the project selection region 802, the project suggestion pane 804, and the project summary pane 806.

The project suggestion pane 804 displays a list of candidate projects for the user 130 to select. Once the user 130 selects a project, the selected project is displayed in the project selection region 802. The 806 displays a summary of activities related to the selected project in project summary pane 806.

Figure 9:
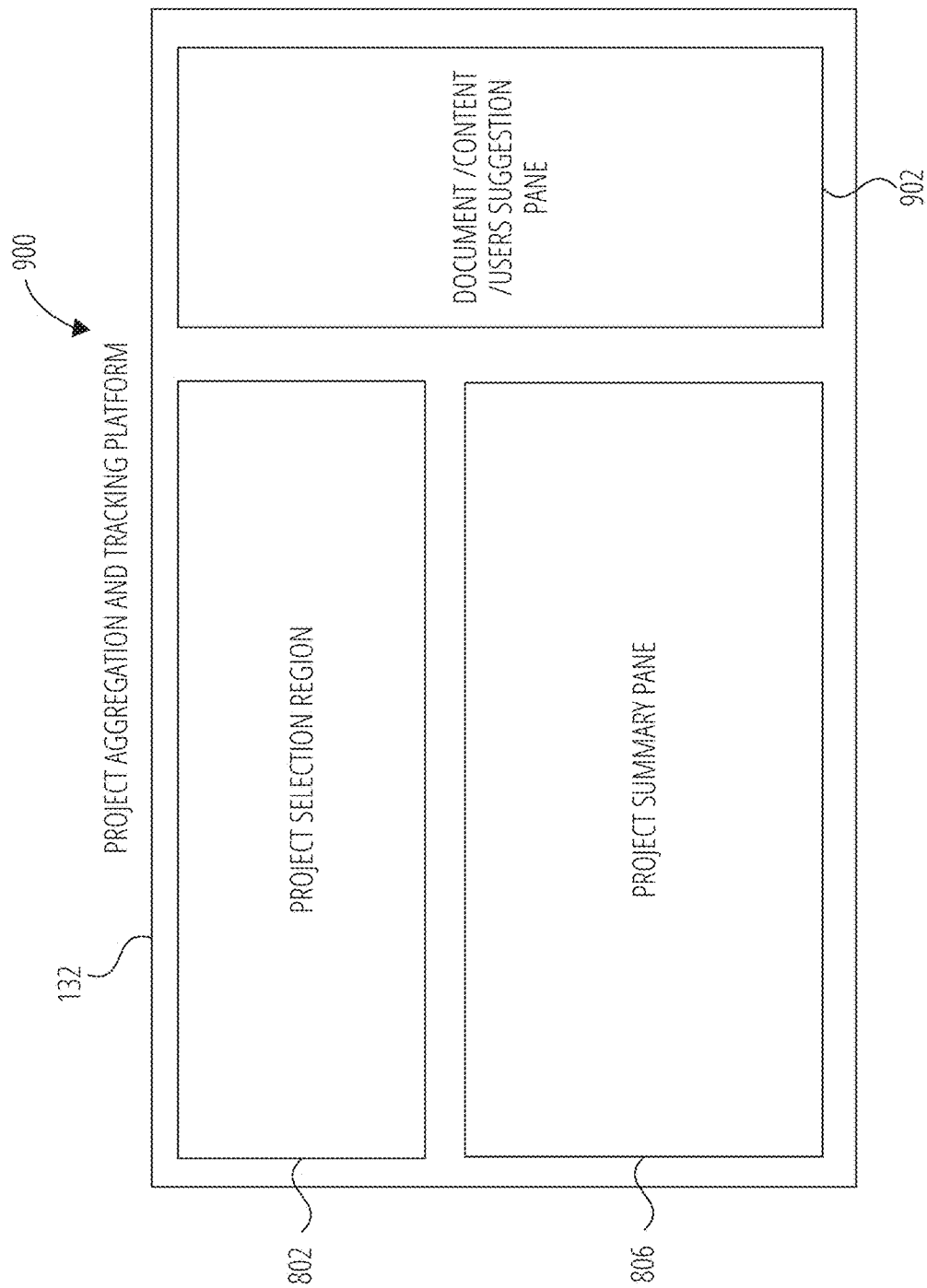
FIG. 9 illustrates an example of a graphical user interface of a project aggregating and tracking platform in accordance with one example embodiment.

FIG. 9 illustrates an example of a graphical user interface 900 in accordance with one example embodiment. The graphical user interface 900 depicts the project aggregation and tracking platform 132, a project selection region 802, the project summary pane 806, and a document/content/users suggestion pane 902.

The project selection region 802 displays the selected project. The project summary pane 806 displays a summary of activities related to the selected project in project selection region 802. The document/content/users suggestion pane 902 display a list of candidate items for the user 130 to select.

Figure 10:
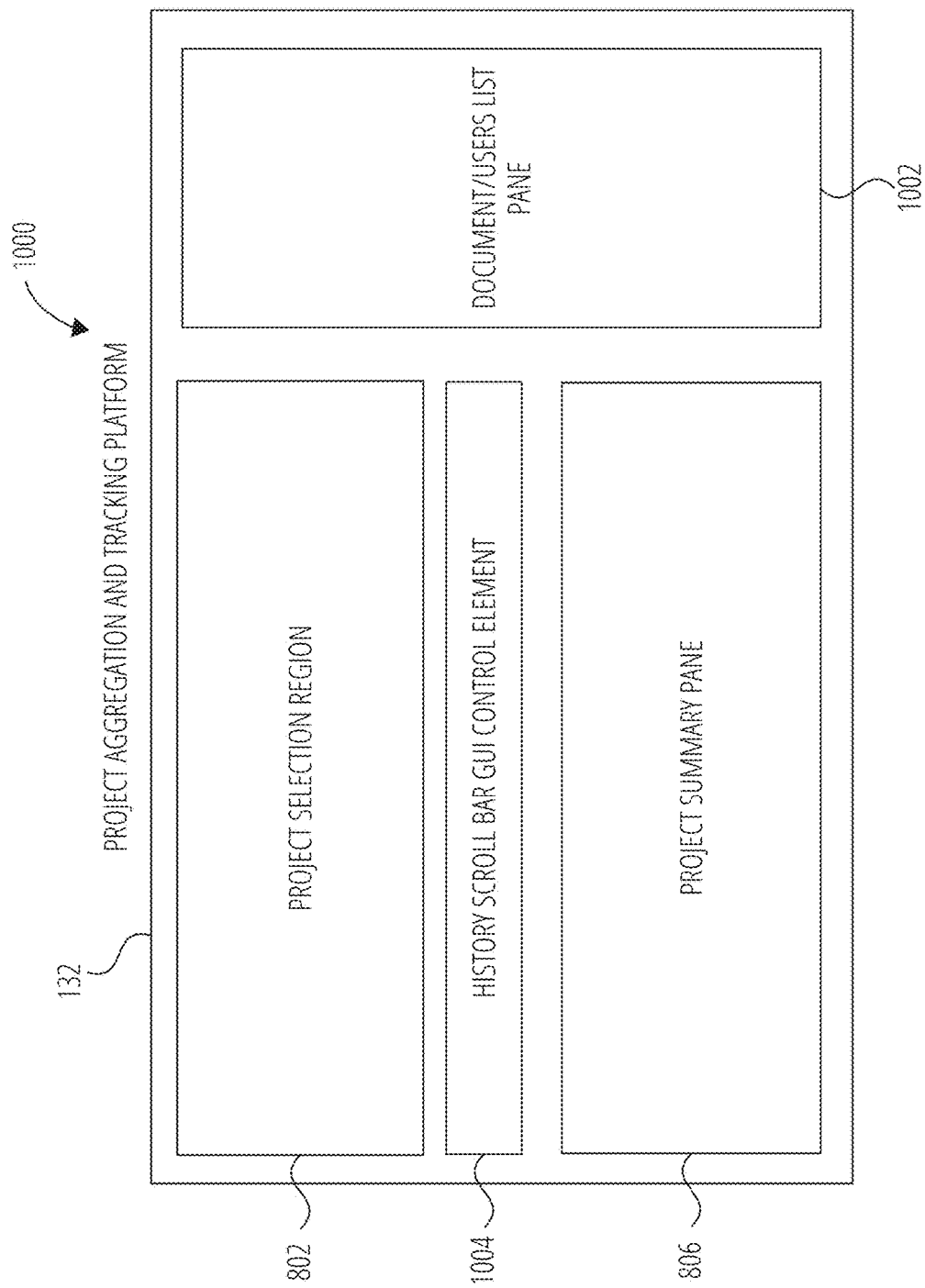
FIG. 10 illustrates an example of a graphical user interface of a summary pane in accordance with one example embodiment.

FIG. 10 illustrates an example of a graphical user interface 1000 in accordance with one example embodiment. The graphical user interface 1000 depicts the project aggregation and tracking platform 132, the project selection region 802, the project summary pane 806, a document/users list pane 1002, and a history scroll bar GUI control element 1004.

The project selection region 802 displays the selected project. The project summary pane 806 displays a summary of activities related to the selected project in project selection region 802. The history scroll bar GUI control element 1004 enables the user 130 to filter activities by predefined time period (e.g., last week, today, next week). The document/content/users suggestion pane 902 display a list of items filtered based on the selected time period.

FIG. 11 illustrates an example graphical user interface 1102 of a project aggregating and tracking platform in accordance with one example embodiment. The graphical user interface 1102 depicts an activity pane 1104, and an item pane 1106.

Figure 12:
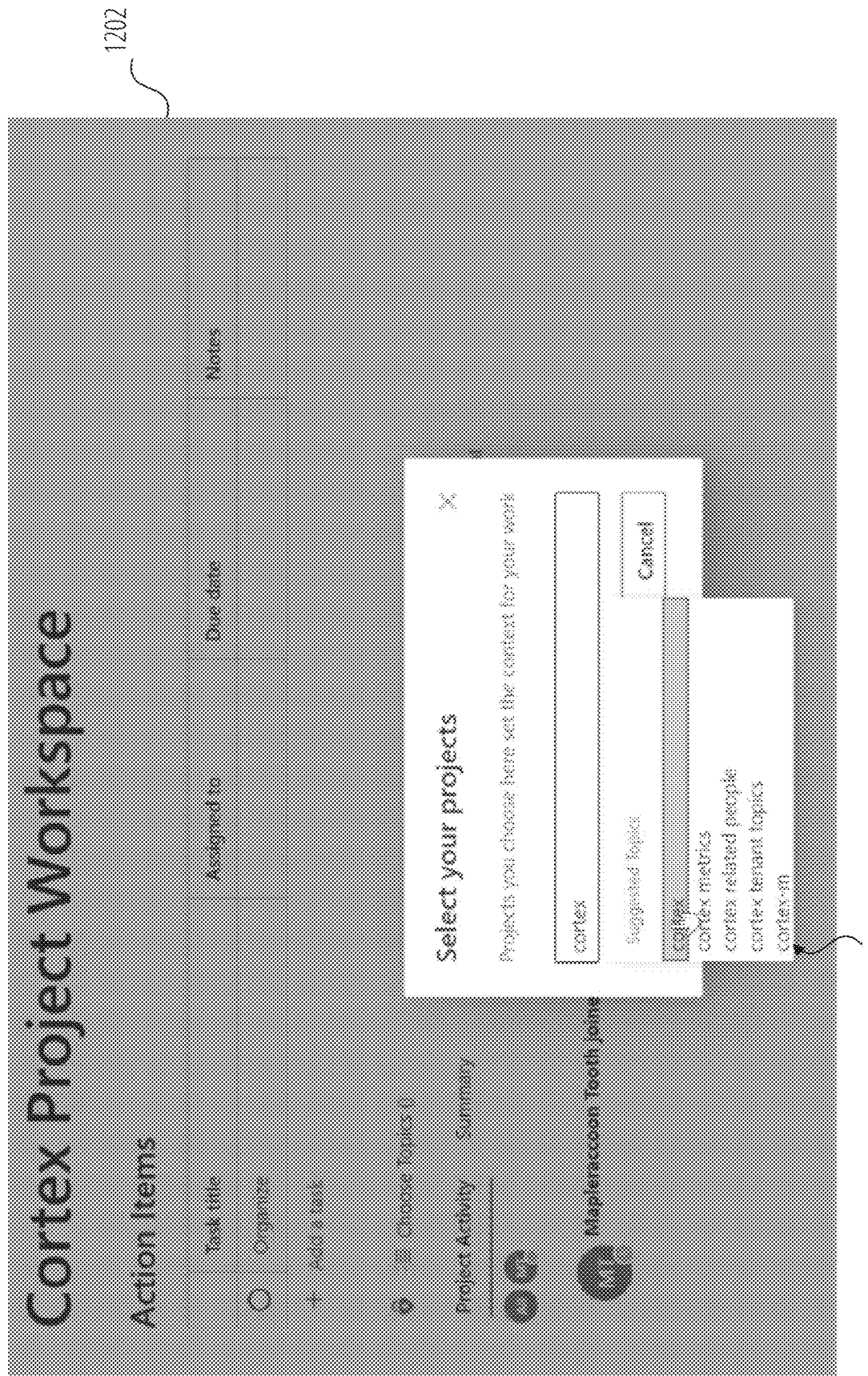
FIG. 12 illustrates an example graphical user interface of a project aggregating and tracking platform in accordance with one example embodiment.

FIG. 12 illustrates an example graphical user interface 1202 of a project aggregating and tracking platform in accordance with one example embodiment. The graphical user interface 1202 depicts candidate projects 1204.

Figure 13:
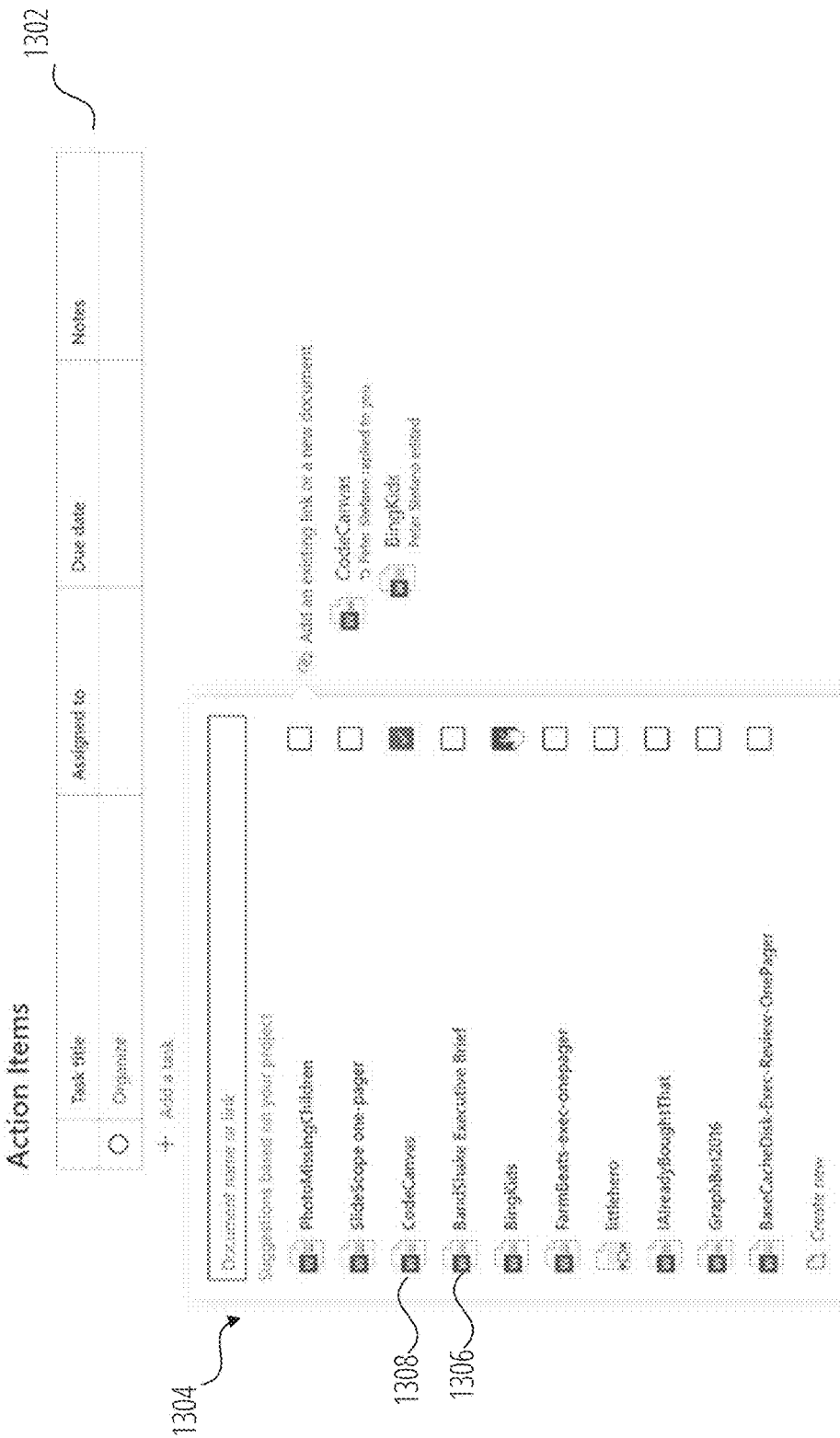
FIG. 13 illustrates an example graphical user interface of a project aggregating and tracking platform in accordance with one example embodiment.

FIG. 13 illustrates an example graphical user interface 1302 of a project aggregating and tracking platform in accordance with one example embodiment. The graphical user interface 1302 depicts candidate items 1304, selected item 1306, and selected item 1308.

Figure 14:
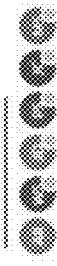
FIG. 14 illustrates an example graphical user interface of a project aggregating and tracking platform in accordance with one example embodiment.

FIG. 14 illustrates an example graphical user interface 1402 of a project aggregating and tracking platform in accordance with one example embodiment. The graphical user interface 1402 depicts project activity view 1404.

Figure 15:
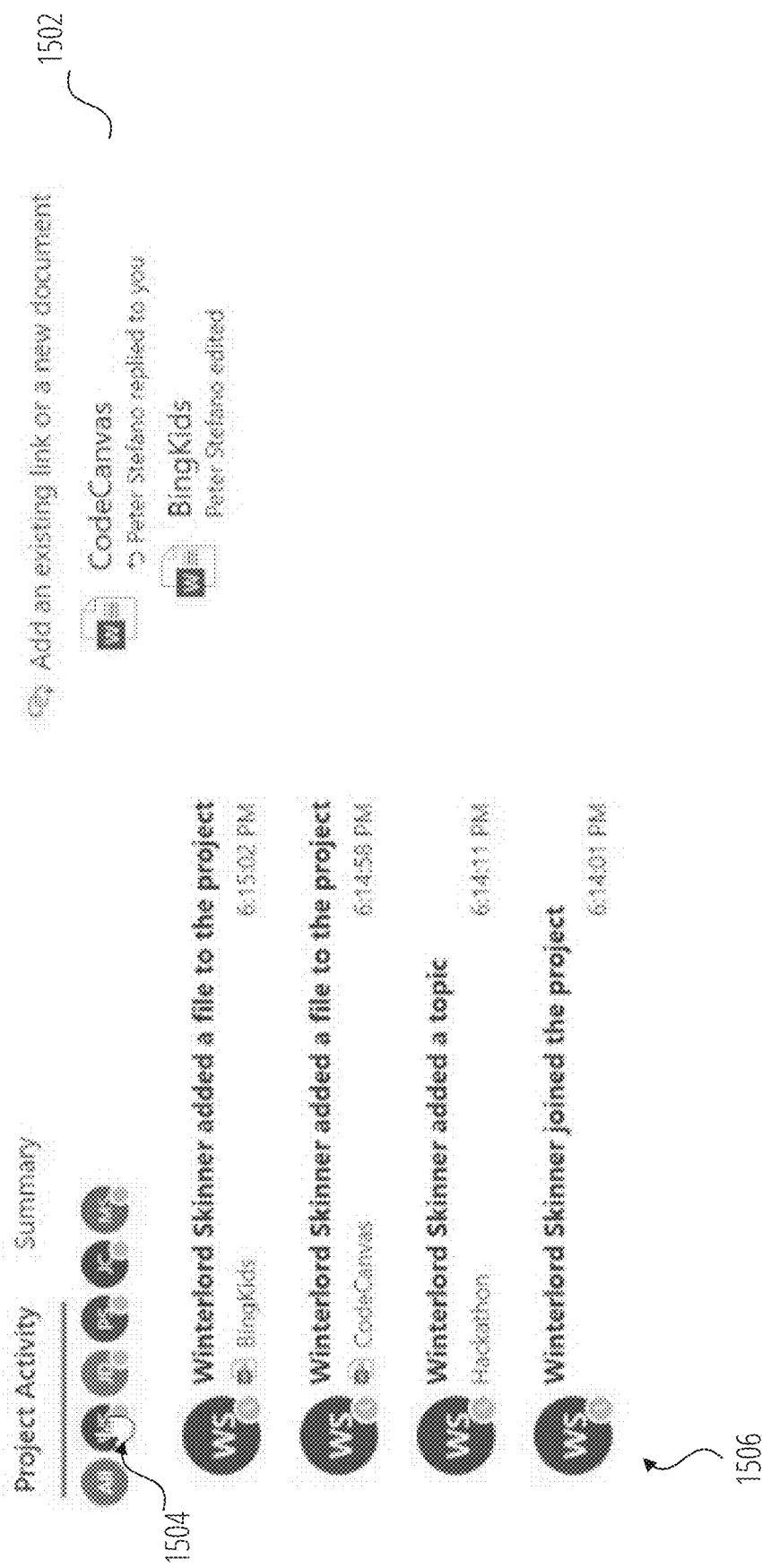
FIG. 15 illustrates an example graphical user interface of a project aggregating and tracking platform in accordance with one example embodiment.

FIG. 15 illustrates an example graphical user interface 1502 of a project aggregating and tracking platform in accordance with one example embodiment. The graphical user interface 1502 depicts selected user filter 1504, and filtered activities 1506.

Figure 16:
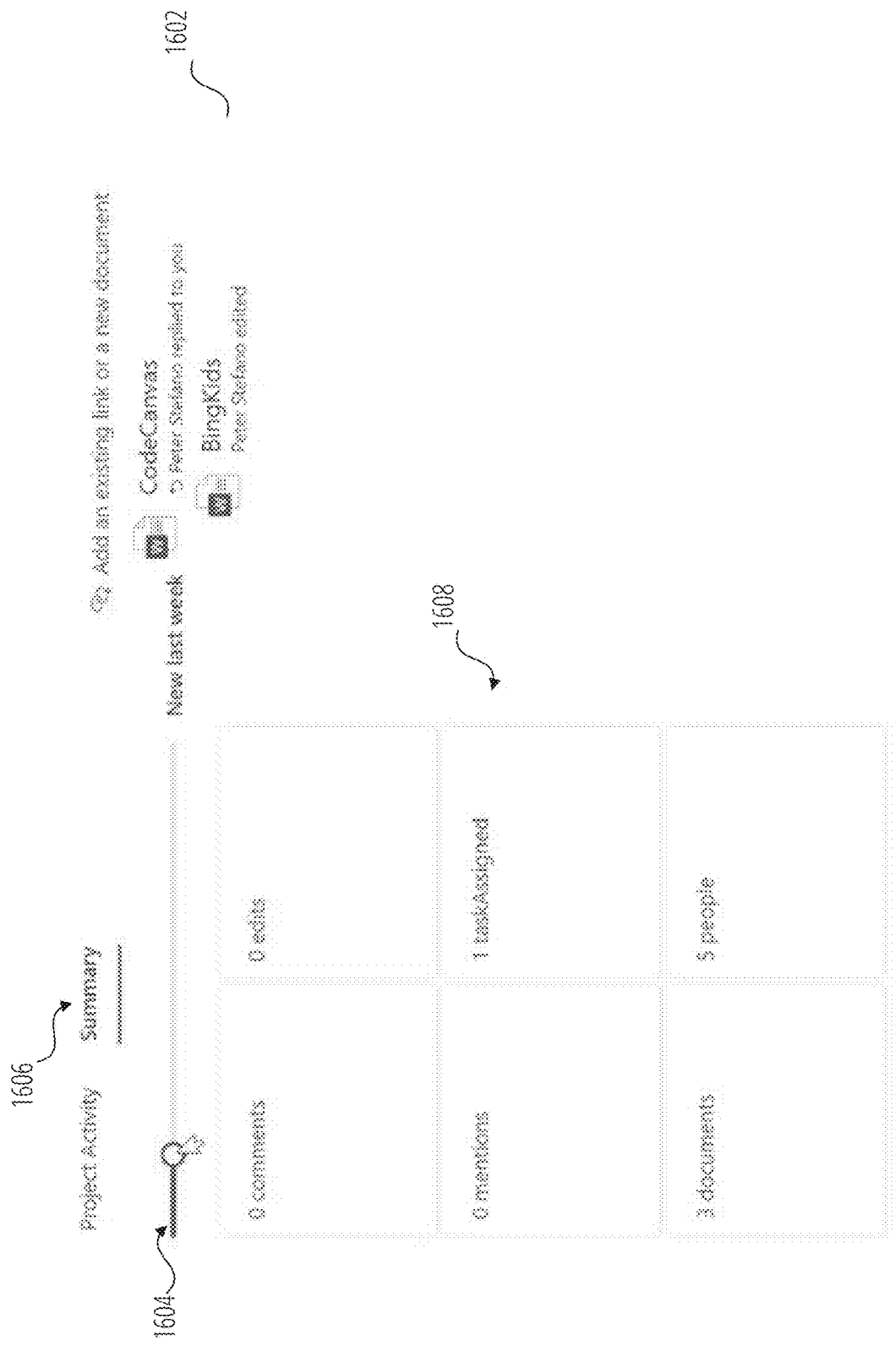
FIG. 16 illustrates an example graphical user interface of a project aggregating and tracking platform in accordance with one example embodiment.

FIG. 16 illustrates an example graphical user interface 1602 of a project aggregating and tracking platform in accordance with one example embodiment. The graphical user interface 1602 depicts time scroll control element 1604, summary view 1606, and category activities 1608.

Figure 17:
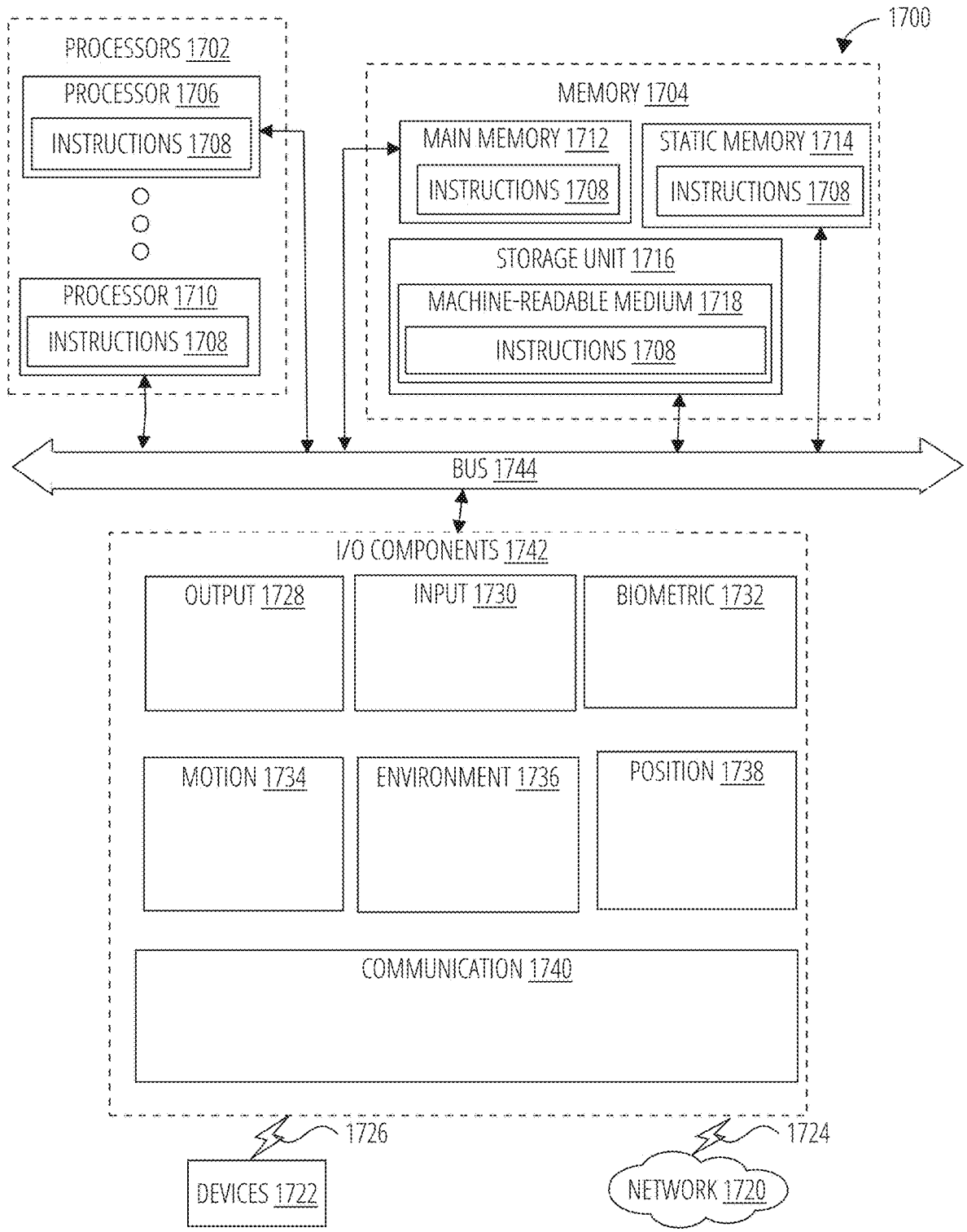
FIG. 17 is a diagrammatic representation of a machine in the form of a computer system within which a set of instructions may be executed for causing the machine to perform any one or more of the methodologies discussed herein, according to an example embodiment.

FIG. 17 is a diagrammatic representation of the machine 1700 within which instructions 1708 (e.g., software, a program, an application, an applet, an app, or other executable code) for causing the machine 1700 to perform any one or more of the methodologies discussed herein may be executed. For example, the instructions 1708 may cause the machine 1700 to execute any one or more of the methods described herein. The instructions 1708 transform the general, non-programmed machine 1700 into a particular machine 1700 programmed to carry out the described and illustrated functions in the manner described. The machine 1700 may operate as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1708, sequentially or otherwise, that specify actions to be taken by the machine 1700. Further, while only a single machine 1700 is illustrated, the term "machine" shall also be taken to include a collection of machines that individually or jointly execute the instructions 1708 to perform any one or more of the methodologies discussed herein.

The machine 1700 may include processors 1702, memory 1704, and I/O components 1742, which may be configured to communicate with each other via a bus 1744. In an example embodiment, the processors 1702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1706 and a processor 1710 that execute the instructions 1708. The term "processor" is intended to include multi-core processors that may comprise two or more independent processors (sometimes referred to as "cores") that may execute instructions contemporaneously. Although FIG. 17 shows multiple processors 1702, the machine 1700 may include a single processor with a single core, a single processor with multiple cores (e.g., a multi-core processor), multiple processors with a single core, multiple processors with multiples cores, or any combination thereof.

The memory 1704 includes a main memory 1712, a static memory 1714, and a storage unit 1716, both accessible to the processors 1702 via the bus 1744. The main memory 1704, the static memory 1714, and storage unit 1716 store the instructions 1708 embodying any one or more of the methodologies or functions described herein. The instructions 1708 may also reside, completely or partially, within the main memory 1712, within the static memory 1714, within machine-readable medium 1718 within the storage unit 1716, within at least one of the processors 1702 (e.g., within the processor's cache memory), or any suitable combination thereof, during execution thereof by the machine 1700.

The I/O components 1742 may include a wide variety of components to receive input, provide output, produce output, transmit information, exchange information, capture measurements, and so on. The specific I/O components 1742 that are included in a particular machine will depend on the type of machine. For example, portable machines such as mobile phones may include a touch input device or other such input mechanisms, while a headless server machine will likely not include such a touch input device. It will be appreciated that the I/O components 1742 may include many other components that are not shown in FIG. 17. In various example embodiments, the I/O components 1742 may include output components 1728 and input components 1730. The output components 1728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1742 may include biometric components 1732, motion components 1734, environmental components 1736, or position components 1738, among a wide array of other components. For example, the biometric components 1732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1734 include acceleration sensor components (e.g., accelerometer), gravitation sensor components, rotation sensor components (e.g., gyroscope), and so forth. The environmental components 1736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1738 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1742 further include communication components 1740 operable to couple the machine 1700 to a network 1720 or devices 1722 via a coupling 1724 and a coupling 1726, respectively. For example, the communication components 1740 may include a network interface component or another suitable device to interface with the network 1720. In further examples, the communication components 1740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1722 may be another machine or any of a wide variety of peripheral devices (e.g., a peripheral device coupled via a USB).

Moreover, the communication components 1740 may detect identifiers or include components operable to detect identifiers. For example, the communication components 1740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1740, such as location via Internet Protocol (IP) geolocation, location via Wi-Fi@ signal triangulation, location via detecting an NFC beacon signal that may indicate a particular location, and so forth.

The various memories (e.g., memory 1704, main memory 1712, static memory 1714, and/or memory of the processors 1702) and/or storage unit 1716 may store one or more sets of instructions and data structures (e.g., software) embodying or used by any one or more of the methodologies or functions described herein. These instructions (e.g., the instructions 1708), when executed by processors 1702, cause various operations to implement the disclosed embodiments.

The instructions 1708 may be transmitted or received over the network 1720, using a transmission medium, via a network interface device (e.g., a network interface component included in the communication components 1740) and using any one of a number of well-known transfer protocols (e.g., hypertext transfer protocol (HTTP)). Similarly, the instructions 1708 may be transmitted or received using a transmission medium via the coupling 1726 (e.g., a peer-to-peer coupling) to the devices 1722.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method comprising: forming a consolidated graphical user interface that tracks activities related to a project identifier, the project identifier identifying aggregated content; receiving a project search query on the consolidated graphical user interface; identifying the project identifier based on the project search query; detecting a selection of the project identifier in the consolidated graphical user interface; identifying and presenting at least one of a content item, a file, a folder, a user identifier, a user message, a meeting identifier, and a website identifier associated with the project identifier, in the consolidated graphical user interface; detecting a selection of at least one of the content item, the file, the user identifier, the user message, the meeting identifier, or the website identifier in the consolidated graphical user interface; registering the selection with the project identifier with a user of the consolidated graphical user interface; and forming the aggregated content assigned to the project identifier and to the user based on the registered selection, the aggregated content comprising a dynamic element that is updated near real-time based on changes to the dynamic element by other users having access to the dynamic element.

Example 2 includes example 1, further comprising: receiving a user input that indicates a link to a document; and adding the document to the aggregated content.

Example 3 includes example 1, further comprising: forming an activity pane in the consolidated graphical user interface associated with the user, the activity pane identifying changes to items in the aggregated content; and presenting the changes to the items in the activity pane.

Example 4 includes example 3, further comprising: arranging an order of the changes to the items presented in the activity pane based on time.

Example 5 includes example 3, further comprising: arranging an order of the changes to the items presented in the activity pane based on users associated with the project identifier.

Example 6 includes example 3, further comprising: presenting, in the activity pane, a list of project user identifiers associated with the project identifier; receiving a selection of a project user identifier; filtering the aggregate content based on the selection of the project user identifier; and presenting the filtered aggregate content in the activity pane.

Example 7 includes example 1, further comprising: forming a summary pane in the consolidated graphical user interface associated with the user, the summary pane identifying a number of changes for each type of aggregated content; and presenting the number of changes for each type of aggregated content in the summary pane.

Example 8 includes example 7, further comprising: forming a timeline and a history scroll control element in the consolidated graphical user interface associated with the user, the history scroll control element filtering the number of changes for each type of aggregated content based on a point on the timeline; detecting a selection of a point on the timeline with the history scroll control element; filtering the aggregate content based on the selected point on the timeline; and presenting the filtered aggregate content in the summary pane.

Example 9 includes example 1, further comprising: forming metadata for the project identifier and an entity attribute, the metadata identifying aggregate content based on the project identifier and the entity attribute, wherein identifying the project identifier based on the project search query further comprises searching metadata of other project identifiers and other entity attributes.

Example 10 includes example 1, further comprising: identifying a user profile of the user operating the consolidated graphical user interface, wherein the user profile of the user indicates an enterprise profile of the user, collaborators of the user, a group within an enterprise to which the user belongs, an operating system of the client device, and a time and day of document authoring application activities of the user; training a machine learning model based on the user profile and the pattern of events a document authoring application registered with the user profile; identifying content based on the machine learning model; and including the identified content in the aggregate content.

Example 11 is a computing apparatus comprising: a processor; and a memory storing instructions that, when executed by the processor, configure the apparatus to: form a consolidated graphical user interface that tracks activities related to a project identifier, the project identifier identifying aggregated content; receive a project search query on the consolidated graphical user interface; identify the project identifier based on the project search query; detect a selection of the project identifier in the consolidated graphical user interface; identify and present at least one of a content item, a file, a folder, a user identifier, a user message, a meeting identifier, and a website identifier associated with the project identifier, in the consolidated graphical user interface; detect a selection of at least one of the content item, the file, the user identifier, the user message, the meeting identifier, or the website identifier in the consolidated graphical user interface; register the selection with the project identifier with a user of the consolidated graphical user interface; and form the aggregated content assigned to the project identifier and to the user based on the registered selection, the aggregated content comprising a dynamic element that is updated near real-time based on changes to the dynamic element by other users having access to the dynamic element.

Example 12 includes example 11, wherein the instructions further configure the apparatus to: receive a user input that indicates a link to a document; and add the document to the aggregated content.

Example 13 includes example 11, wherein the instructions further configure the apparatus to: form an activity pane in the consolidated graphical user interface associated with the user, the activity pane identifying changes to items in the aggregated content; and present the changes to the items in the activity pane.

Example 14 includes example 13, wherein the instructions further configure the apparatus to: arrange an order of the changes to the items presented in the activity pane based on time.

Example 15 includes example 13, wherein the instructions further configure the apparatus to: arrange an order of the changes to the items presented in the activity pane based on users associated with the project identifier.

Example 16 includes example 13, wherein the instructions further configure the apparatus to: present, in the activity pane, a list of project user identifiers associated with the project identifier; receive a selection of a project user identifier; filter the aggregate content based on the selection of the project user identifier; and present the filtered aggregate content in the activity pane.

Example 17 includes example 11, wherein the instructions further configure the apparatus to: form a summary pane in the consolidated graphical user interface associated with the user, the summary pane identifying a number of changes for each type of aggregated content; and present the number of changes for each type of aggregated content in the summary pane.

Example 18 includes example 17, wherein the instructions further configure the apparatus to: form a timeline and a history scroll control element in the consolidated graphical user interface associated with the user, the history scroll control element filtering the number of changes for each type of aggregated content based on a point on the timeline; detect a selection of a point on the timeline with the history scroll control element; filter the aggregate content based on the selected point on the timeline; and present the filtered aggregate content in the summary pane.

Example 19 includes example 11, wherein the instructions further configure the apparatus to: form metadata for the project identifier and an entity attribute, the metadata identifying aggregate content based on the project identifier and the entity attribute, wherein identifying the project identifier based on the project search query further comprises search metadata of other project identifiers and other entity attributes.

Example 20 is a non-transitory computer-readable storage medium, the computer-readable storage medium including instructions that when executed by a computer, cause the computer to: form a consolidated graphical user interface that tracks activities related to a project identifier, the project identifier identifying aggregated content; receive a project search query on the consolidated graphical user interface; identify the project identifier based on the project search query; detect a selection of the project identifier in the consolidated graphical user interface; identify and present at least one of a content item, a file, a folder, a user identifier, a user message, a meeting identifier, and a website identifier associated with the project identifier, in the consolidated graphical user interface; detect a selection of at least one of the content item, the file, the user identifier, the user message, the meeting identifier, or the website identifier in the consolidated graphical user interface; register the selection with the project identifier with a user of the consolidated graphical user interface: and form the aggregated content assigned to the project identifier and to the user based on the registered selection, the aggregated content comprising a dynamic element that is updated near real-time based on changes to the dynamic element by other users having access to the dynamic element.

What is claimed is:

1. A computer-implemented method comprising:
generating a consolidated graphical user interface that tracks activities related to a project identifier, the project identifier identifying aggregated content;
generating metadata for the project identifier and an entity attribute, the metadata identifying aggregate content based on the project identifier and the entity attribute;
receiving a project search query on the consolidated graphical user interface;
identifying the project identifier based on the project search query by searching metadata of other project identifiers and other entity attributes;
detecting a selection of the project identifier in the consolidated graphical user interface;
identifying and presenting at least one of a content item, a file, a folder, a user identifier, a user message, a meeting identifier, and a website identifier associated with the project identifier, in the consolidated graphical user interface;
detecting a selection of at least one of the content item, the file, the user identifier, the user message, the meeting identifier, or the website identifier in the consolidated graphical user interface;
registering the selection with the project identifier with a user of the consolidated graphical user interface;
generating the aggregated content assigned to the project identifier and to the user based on the registered selection, the aggregated content comprising a dynamic element that is updated near real-time based on changes to the dynamic element by other users having access to the dynamic element;
identifying a user profile of the user operating the consolidated graphical user interface, wherein the user profile of the user indicates an enterprise profile of the user, collaborators of the user, a group within an enterprise to which the user belongs, an operating system of a client device, and a time and day of document authoring application activities of the user;

training a machine learning model based on the user profile and a pattern of events of a document authoring application registered with the user profile;

identifying content based on the machine learning model and including the identified content in the aggregate content; and updating near real-time the aggregated content in the consolidated graphical user interface based on a user selection of a time scroll user interface element in the consolidated graphical user interface and based on changes to the dynamic element by other users having access to the dynamic element.

2. The computer-implemented method of claim 1, further comprising:

receiving a user input that indicates a link to a document; and adding the document to the aggregated content.

3. The computer-implemented method of claim 1, further comprising:

forming an activity pane in the consolidated graphical user interface associated with the user, the activity pane identifying changes to items in the aggregated content; and presenting the changes to the items in the activity pane.

4. The computer-implemented method of claim 3, further comprising:

arranging an order of the changes to the items presented in the activity pane based on time.

5. The computer-implemented method of claim 3, further comprising:

arranging an order of the changes to the items presented in the activity pane based on users associated with the project identifier.

6. The computer-implemented method of claim 3, further comprising:

presenting, in the activity pane, a list of project user identifiers associated with the project identifier;

receiving a selection of a project user identifier;

filtering the aggregate content based on the selection of the project user identifier; and presenting the filtered aggregate content in the activity pane.

7. The computer-implemented method of claim 1, further comprising:

generating a summary pane in the consolidated graphical user interface associated with the user, the summary pane identifying a number of changes for each type of aggregated content; and presenting the number of changes for each type of aggregated content in the summary pane.

8. A computing apparatus comprising:

a processor; and a memory storing instructions that, when executed by the processor, configure the apparatus to:

generate a consolidated graphical user interface that tracks activities related to a project identifier, the project identifier identifying aggregated content;

generate metadata for the project identifier and an entity attribute, the metadata identifying aggregate content based on the project identifier and the entity attribute;

receive a project search query on the consolidated graphical user interface;

identify the project identifier based on the project search query by searching metadata of other project identifiers and other entity attributes;

detect a selection of the project identifier in the consolidated graphical user interface;

identify and present at least one of a content item, a file, a folder, a user identifier, a user message, a meeting identifier, and a website identifier associated with the project identifier, in the consolidated graphical user interface;

detect a selection of at least one of the content item, the file, the user identifier, the user message, the meeting identifier, or the website identifier in the consolidated graphical user interface;

register the selection with the project identifier with a user of the consolidated graphical user interface;

generate the aggregated content assigned to the project identifier and to the user based on the registered selection, the aggregated content comprising a dynamic element that is updated near real-time based on changes to the dynamic element by other users having access to the dynamic element;

identify a user profile of the user operating the consolidated graphical user interface, wherein the user profile of the user indicates an enterprise profile of the user, collaborators of the user, a group within an enterprise to which the user belongs, an operating system of a client device, and a time and day of document authoring application activities of the user;

train a machine learning model based on the user profile and a pattern of events of a document authoring application registered with the user profile;

identify content based on the machine learning model and including the identified content in the aggregate content; and update near real-time the aggregated content in the consolidated graphical user interface based on a user selection of a time scroll user interface element in the consolidated graphical user interface and based on changes to the dynamic element by other users having access to the dynamic element.

9. The computing apparatus of claim 8, wherein the instructions further configure the apparatus to:

receive a user input that indicates a link to a document; and add the document to the aggregated content.

10. The computing apparatus of claim 8, wherein the instructions further configure the apparatus to:

form an activity pane in the consolidated graphical user interface associated with the user, the activity pane identifying changes to items in the aggregated content; and present the changes to the items in the activity pane.

11. The computing apparatus of claim 10, wherein the instructions further configure the apparatus to:

arrange an order of the changes to the items presented in the activity pane based on time.

12. The computing apparatus of claim 10, wherein the instructions further configure the apparatus to:

arrange an order of the changes to the items presented in the activity pane based on users associated with the project identifier.

13. The computing apparatus of claim 10, wherein the instructions further configure the apparatus to:

present, in the activity pane, a list of project user identifiers associated with the project identifier;

receive a selection of a project user identifier;

filter the aggregate content based on the selection of the project user identifier; and present the filtered aggregate content in the activity pane.

14. The computing apparatus of claim 8, wherein the instructions further configure the apparatus to:

generate a summary pane in the consolidated graphical user interface associated with the user, the summary pane identifying a number of changes for each type of aggregated content; and present the number of changes for each type of aggregated content in the summary pane.

15. A non-transitory computer-readable storage medium, the computer-readable storage medium including instructions that when executed by a computer, cause the computer to:

generate a consolidated graphical user interface that tracks activities related to a project identifier, the project identifier identifying aggregated content;

generate metadata for the project identifier and an entity attribute, the metadata identifying aggregate content based on the project identifier and the entity attribute;

receive a project search query on the consolidated graphical user interface;

identify the project identifier based on the project search query by searching metadata of other project identifiers and other entity attributes;

detect a selection of the project identifier in the consolidated graphical user interface;

identify and present at least one of a content item, a file, a folder, a user identifier, a user message, a meeting identifier, and a website identifier associated with the project identifier, in the consolidated graphical user interface;

detect a selection of at least one of the content item, the file, the user identifier, the user message, the meeting identifier, or the website identifier in the consolidated graphical user interface;

register the selection with the project identifier with a user of the consolidated graphical user interface;

generate the aggregated content assigned to the project identifier and to the user based on the registered selection, the aggregated content comprising a dynamic element that is updated near real-time based on changes to the dynamic element by other users having access to the dynamic element;

identify a user profile of the user operating the consolidated graphical user interface, wherein the user profile of the user indicates an enterprise profile of the user, collaborators of the user, a group within an enterprise to which the user belongs, an operating system of a client device, and a time and day of document authoring application activities of the user;

train a machine learning model based on the user profile and a pattern of events of a document authoring application registered with the user profile;

identify content based on the machine learning model and including the identified content in the aggregate content; and update near real-time the aggregated content in the consolidated graphical user interface based on a user selection of a time scroll user interface element in the consolidated graphical user interface and based on changes to the dynamic element by other users having access to the dynamic element.

* * * * *